(12) United States Patent
Hecht et al.

(10) Patent No.: US 8,128,530 B2
(45) Date of Patent: *Mar. 6, 2012

(54) METHOD FOR AUTOMATICALLY CONTROLLING A NEUTRAL POSITION AND A PARKING LOCK OF A MOTOR VEHICLE TRANSMISSION

(75) Inventors: Walter Hecht, Ravensburg (DE); Armin Gierling, Langenargen (DE); Klaus Steinhauser, Kressbronn (DE); Frank Worms, Langenargen (DE); Bernd Zänglein, Ravensburg (DE); Stéphane Klein, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 751 days.

This patent is subject to a terminal disclaimer.

(21) Appl. No.: 12/257,621

(22) Filed: Oct. 24, 2008

(65) Prior Publication Data

US 2009/0111648 A1   Apr. 30, 2009

(30) Foreign Application Priority Data

Oct. 24, 2007   (DE) .......................... 10 2007 000 557

(51) Int. Cl.
  *B60W 10/00* (2006.01)
  *F16H 59/60* (2006.01)
  *F16H 59/62* (2006.01)
  *F16H 59/74* (2006.01)

(52) U.S. Cl. ................ 477/92; 477/94; 477/96; 477/97; 477/101

(58) Field of Classification Search .............. 477/92–94, 477/96, 97, 99, 101–106; 701/70
See application file for complete search history.

(56) References Cited

U.S. PATENT DOCUMENTS

| | | |
|---|---|---|
| 3,937,105 A | 2/1976 | Arai et al. |
| 4,892,014 A | 1/1990 | Morell et al. |
| 5,919,112 A | 7/1999 | Michael et al. |
| 8,016,719 B2 * | 9/2011 | Hecht et al. ..................... 477/92 |
| 2009/0024286 A1 * | 1/2009 | Gierling et al. ................. 701/51 |
| 2009/0111647 A1 * | 4/2009 | Hecht et al. ..................... 477/92 |
| 2010/0326148 A1 * | 12/2010 | Gierling et al. ................. 70/248 |
| 2011/0198190 A1 * | 8/2011 | Steinhauser et al. ........ 192/219.5 |

FOREIGN PATENT DOCUMENTS

| | | |
|---|---|---|
| DE | 41 27 991 A1 | 2/1993 |
| EP | 0 814 287 A2 | 12/1997 |

* cited by examiner

*Primary Examiner* — Tisha Lewis
(74) *Attorney, Agent, or Firm* — Davis & Bujold, P.L.L.C.

(57) ABSTRACT

A method of automatically controlling a neutral position and parking lock of an motor-vehicle transmission to immobilize the vehicle depending on a drive position of the transmission selected by the driver with a selector device and subject to other operating parameters of the motor vehicle. Only when simultaneously the vehicle is essentially stationary, an ignition circuit is electrically interrupted and the selector device is in a "Neutral" position, can an Neutral-holding phase be activated, in which the transmission is in a non-frictionally engaged neutral position as long as the parking lock of the transmission has not yet been engaged. If the Neutral-holding phase has not been activated, the transmission remains non-frictionally connected in the Neutral position until the driver at least intends to exit the vehicle, at which time the parking lock of the transmission is automatically engaged.

25 Claims, 2 Drawing Sheets

METHOD FOR AUTOMATICALLY CONTROLLING A NEUTRAL POSITION AND A PARKING LOCK OF A MOTOR VEHICLE TRANSMISSION

This application claims priority from German Application Serial No. 10 2007 000 557.3 filed Oct. 24, 2007.

FIELD OF THE INVENTION

The invention relates to a method of automatically controlling a neutral position and a parking lock of an automatic or automated motor-vehicle transmission, where the neutral position and the parking lock of the transmission for immobilizing the vehicle can be engaged subject to a drive position (P, R, N, D) selected using a selector device and subject to other operating parameters of the motor vehicle. The invention also relates to a motor vehicle controlled by way of this method.

BACKGROUND OF THE INVENTION

Known automatic or automated motor vehicle transmissions normally feature a parking lock with which an output shaft of the transmission can be mechanically immobilized. In addition to a purely mechanical system for actuating such a parking lock by way of a mechanical functional connection between a gear selector lever operated by the driver in the interior of the motor vehicle and the parking lock in the transmission, electromechanical and electrohydraulic systems for actuating such a parking lock are known from DE 4127991 C2. The parking lock in the transmission is connected by way of an electrical functional connection with a selector device that can be operated by the driver in the interior of the motor vehicle, and in which case the parking lock can be electromechanically, or as the case may be electrohydraulically actuated such that a parking lock function implemented by an electronic control device of the transmission, subject to a drive position selected on the selector device and subject to other operating parameters of the motor vehicle.

In addition, different methods are known for automatically engaging such a parking lock. It is thus proposed in U.S. Pat. No. 3,937,105 that the parking lock of the transmission is automatically engaged independently of the drive position selected by the driver when an ignition circuit of the motor vehicle is interrupted and, at the same time, the motor vehicle's velocity is lower than a defined low threshold level.

In U.S. Pat. No. 4,892,014, a method is known in which the parking lock of the transmission is automatically, electromotively engaged when an ignition circuit of the motor vehicle is interrupted and, at the same time, the velocity of the motor vehicle is lower than a defined threshold, but also when the driver's door of the motor vehicle is open and the driver's seat of the motor vehicle is not occupied and, at the same time, the speed of the vehicle is lower than the cited low threshold level. In both cases, it is provided that when the parking lock is automatically engaged, a parking brake of the motor vehicle will also be automatically actuated. In U.S. Pat. No. 4,892,014, it is also proposed that when the ignition circuit is closed, without the drive motor of the motor vehicle running, the transmission will automatically, electromotively switch to its neutral position without the necessity of a command from the driver.

And finally, from EP 0 814 287 B1, a function for automatically engaging the parking lock of an automatic transmission is known in which the parking lock in the automatic transmission is automatically engaged byway of the gear control device when the driving speed of the vehicle is zero and, at the same time, an ignition circuit is interrupted and, at the same time, as a supplementary condition, either a predetermined period of time after the interruption of the ignition circuit has passed or a vehicle door has been opened, however no later—and then as the sole condition—that the ignition key has been removed from the ignition switch.

In order to achieve better vehicle availability, the engagement of the parking lock is prevented as a distinctive feature in all three cases, when the driver immediately, before turning off the engine or within a predetermined period of time after switching off the engine, has selected the drive state neutral using the selector lever.

The present invention is based upon the objective of devising an alternative method to the state of the art for automatically controlling a neutral position and a parking lock in an automatic or automated transmission of a motor vehicle with adequate safeguarding of the motor vehicle against starting or coasting of the vehicle that is not intended by the driver and with as little impairment of drivability or maneuverability of the vehicle as possible, while avoiding changes in the operating state of the transmission or the vehicle, which would be surprising for the driver.

SUMMARY OF THE INVENTION

In the method of the invention, an Auto_P function with complex function logic is proposed, which is based on a method in which a neutral position of an automatic or automated transmission of a motor vehicle and a parking lock of the transmission for immobilizing the motor vehicle are automatically engaged, subject to a drive position that is selected by the driver of the motor vehicle on a selector device and subject to other operating parameters of the motor vehicle. Essential to the invention is the functional connection of individual aspects or individual criteria. In the interest of a clear and unambiguous presentation of these functional connections, known Boolean logical operators will be used below and for better readability, they will be accentuated through the use of capital letters in notation.

Inventively, the method features the following procedural steps.

WHEN the motor vehicle is at least approximately stationary, AND at the same time, an ignition circuit acting on a drive motor of the motor vehicle is electrically interrupted, AND at the same time, a drive position "Park" (P) has been selected using the selector device, THEN the parking lock of the transmission is and will remain automatically engaged:

WHEN the motor vehicle is at least approximately stationary, AND at the same time, the ignition circuit of the drive motor is electrically interrupted, AND at the same time, a drive position "Forward" (D) or "Reverse" (R) has been selected, THEN the parking lock of the transmission will be automatically engaged;

WHEN the motor vehicle is at least approximately stationary, AND at the same time, the ignition circuit of the drive motor is electronically interrupted, AND at the same time, a drive position "Neutral" (N) has been selected using the selector device, AND at the same time, an N-holding phase that can be activated by way of a separate operator device supplied additionally to the selector device has been activated, provided the parking lock of the transmission has not yet been engaged, THEN the transmission will automatically be switched into the non-frictionally connected position and temporarily held in a non-frictionally connected neutral position, WHEN the motor vehicle is at least approximately stationary AND at the same time, the ignition circuit of the drive engine is electrically interrupted, AND at the same time, a drive position "Neutral" (N) has been selected using the selector device, AND at the same time, the N-holding phase has not been activated, THEN the transmission will automatically be held in the non-frictionally connected neutral position until it is recognized that the driver intends to exit the vehicle or is in the process of exiting it, whereas when it has been recognized that the driver is exiting the vehicle or intends to do so, the parking lock of the transmission is automatically engaged.

It is proposed that it is possible to activate an N-holding phase by way of a separate operating device provided in addition to the selector device in which phase the transmission is in a non-frictionally locked neutral position. However, this N-holding phase cannot generally be activated if, using the selector device, a drive state other than "Neutral" (N) has been specified, as long as the parking lock of the transmission has not yet been engaged. In this context, a time stage can be predefined, within which the N-holding phase must be activated using the separate operating device, so that the parking lock of the transmission is not automatically engaged. Advantageously, such a time stage starts at the point in time at which the ignition circuit is electrically interrupted. Furthermore, the N-holding phase can, in general, only be activated when the motor vehicle is almost completely at a standstill and, at the same time, an ignition circuit acting on the drive motor of the motor vehicle is electrically interrupted.

The method of the invention can be expediently used when the driver of the motor vehicle has stopped in front of a car-washing facility and has switched off the motor by interrupting the ignition circuit that acts on the drive motor; the transmission of the motor vehicle, for reasons inherent to the system—for example because of the absence of oil pressure in the transmission due to a now idle oil pump—would automatically engage the parking lock without additional steps.

With the method of the invention, it is possible for the driver, using simple operating means, to deliberately and quickly put the motor vehicle into an operating state in which it can coast, despite the motor being disengaged, provided the drive state "Neutral" (N) has been previously specified. However, if a drive state other than "Neutral" (N) has been specified using the selector device, the motor vehicle, for safety reasons, is generally put into a state with a fixed output.

As a result, through the interconnection of the cited four individual functions of the method of the invention by way of logical AND, very high vehicle availability is achieved, along with a high degree of security for the vehicle occupants and the surrounding area against unintentional coasting of the vehicle.

The first of these four individual functions of the method of the invention ("WHEN the motor vehicle has at least approximately come to a stop, AND at the same time, an ignition circuit acting on the drive motor of the vehicle is electrically interrupted, AND at the same time, a drive position "Park" (P) has been selected using the selector device, THEN the parking lock of the vehicle transmission is and will remain locked) takes into account, in the first place, those operating states in which the driver, before or during recognition that the motor vehicle is at a standstill with an uninterrupted ignition circuit or has at least almost come to a stop, has himself selected the park position using the selector device of the motor vehicle.

Secondly, the first of the four individual functions of the method of the inventions also takes into account those operating states in which the driver has selected the park position during the previously activated N-holding phase using the selector device of the motor vehicle and, in that way, deliberately terminated the previously activated N-holding phase. This definite driver wish, that the motor vehicle be brought to a stop by engaging the parking lock on the transmission side, is implemented as part of the cited first individual function in the transmission.

The second of the four individual functions of the method of the invention ("WHEN the motor vehicle is at least approximately stationary, AND at the same time, the ignition circuit of the drive motor is electrically interrupted AND at the same time a drive position "Forward" (D) or "Reverse" (R) has been selected, THEN the parking lock of the transmission is automatically engaged") takes into account the operating states in which the selector device, before or during recognition that the motor vehicle, with an uninterrupted ignition circuit, is stationary or at least almost stationary, is in a position in which a running drive motor or sufficient pressure medium supply to the transmission, will result in a frictional connection in the transmission. In this case, for safety reasons, the parking lock of the transmission is automatically engaged, in order to prevent accidental coasting of the vehicle.

The third of the four individual functions of the method of the invention ("WHEN the motor vehicle is at least approximately stationary, AND at the same time, the ignition circuit of the drive motor is electrically interrupted, AND at the same time, using the selector device, a drive position "Neutral" (N) has been selected, AND at the same time, an N-holding phase that is activateable by a separate operating device provided additionally to the selector device, as long as the parking lock of the transmission is not yet engaged, THEN the transmission is automatically switched to the neutral position without frictional connection and kept temporarily in a neutral position without frictional connection") defines the possibility of deliberately putting the transmission into the state without frictional connection under very definite conditions. In the first place, the entry criteria are listed that must be met in order to activate the N-holding phase. Secondly, the state of the transmission in the activated N-holding phase is clearly described. In addition, it is already specified in connection with the third individual function, that the transmission cannot be put indefinitely into a state without frictional connection using of the method of the invention, which will be discussed in detail below.

In the framework of the third individual function, the previously mentioned predefined time stage can be specified, within which the N-holding phase must be activated using the separate operating device, so that the parking lock of the transmission is not automatically engaged. Advantageously, such a time stage begins at the point in time at which the ignition circuit is electrically interrupted. A typical value for such a time stage is a period of time between 1 and 10 seconds.

In addition to the cited entry criteria, which are stipulated as essential in order to activate the N-holding phase in which the transmission is in a neutral position without frictional connection, additional entry criteria can be provided that must also be met in order to activate the N-holding phase. It can be provided that in addition to the previously cited four entry criteria: "motor vehicle is at least approximately stationary", "the ignition circuit acting on the drive motor is electrically interrupted", "the drive position neutral (N) has been selected" and "the parking lock of the transmission is not yet engaged", which must be met at the same time in order to activate the N-holding phase using the separate operating device, an additional requirement, "motor vehicle is in an at least approximately horizontal position", must be met, at the same time, in order to activate the N-holding phase.

For example, it can also be provided that in addition to the four entry criteria: "motor vehicle is at least approximately stationary", "the ignition circuit acting on the drive motor is electrically interrupted", "the drive position neutral (N) is has been selected" and "the parking lock of the transmission is not yet engaged", which must be met simultaneously in order activate, by way of the separate operating device, the N-holding phase in which the transmission is in a neutral position without frictional connection, an additional requirement: "ignition key has not been removed from a mechanical or electromechanical ignition switch assigned to the ignition key or is not outside a defined zone surrounding an ignition switch of the motor vehicle that is assigned to the ignition key", must be met at the same time in order to activate the N-holding phase.

All of the cited entry criteria can also be combined in appropriate ways. It can be provided that the N-holding phase can only be activated WHEN the motor vehicle is in an at least approximately horizontal position, AND at the same time, a determined current speed of the motor vehicle is lower than a predefined low threshold value (typically lower than 5 km/h (3.1 mi/h)), AND at the same time, an ignition key has not been removed from a mechanical or an electromechanical ignition switch assigned to the ignition key or is not outside a defined zone surrounding an electronic ignition key of the motor vehicle that is assigned to the ignition key, AND at the same time, using a selector device, a drive position "Neutral (N) has been selected, AND at the same time, the parking lock of the transmission has not yet been engaged. In this case, five individual functions, each with its own functional logic, are combined by way of Boolean AND-operators into one complex entry criterion.

In addition, it can also be provided that the N-holding phase can only be activated when it is recognized that the driver of the motor vehicle does not intend to exit the vehicle or is not in the process of doing so. An intention or action on the part of the driver, that he wishes to exit the vehicle or that the driver is actually in the process of exiting the vehicle, can be assumed when at least one or several of following criteria are met:

"a driver's door of the motor vehicle is open"
"a driver's seat belt is unbuckled"
"a driver's seat occupancy recognition device reports an unoccupied driver's seat"

whereby it is reasonable to functionally combine at least two of these criteria by means of "logical AND".

In addition, it can also be provided that the N-holding phase can only be activated when an energy management means of the motor vehicle or the transmission detects that a sufficient quantity of energy is available to keep the transmission in a neutral position without frictional connection, at least for a predefined period of time. A partial function of this kind serves to protect the vehicle's electrical system and ensure the starting capacity of the drive motor. Reference is made in this context to conventional transmission constructions with an electrohydraulically actuatable parking lock system, in which the parking lock is engaged by hydraulic pressure, is kept in an engaged state by way of an electrically charged electromagnet and, in the absence of hydraulic pressure or the current supply to electricity to an electromagnet, is engaged by way of spring pressure. Using the proposed functional enlargement, it can be assured, particularly in connection with this such transmissions, that the N-holding phase cannot be activated when it has been detected, shortly after activation of the N-holding phase, that the vehicle's electric system cannot supply the electric energy required in sufficient quantity or cannot supply it at all. In this way, an abrupt emergency interruption of the previously activated N-holding phase, which would surprise the driver, is avoided and the starting capacity of the motor is ensured, particularly in the case of applications where such emergency interruption of the previously activated N-holding phase is not functionally implemented.

A technically simple, practical embodiment of this kind of function for protecting the electrical system of the motor vehicle and for ensuring the starting capacity of the drive motor, can involve activation of the N-holding phase being prohibited when the present electrical voltage and/or the condition of the present electrical charge in the vehicle's energy storage unit, whose electrical energy is intended for starting the drive motor and/or for supplying the transmission control system, has fallen below a predefined lower threshold value. In this case, the term "predefined lower threshold value" shall be understood as an absolute numerical value, for example an electric voltage of 12.5 volts.

In a technically more expensive, but functionally more precise embodiment of such a function for protecting the electric system of the motor vehicle and ensuring the starting capacity of the drive motor, it is proposed that the present charge state of the energy storage unit or the charge state of the energy storage unit at the beginning of the N-holding phase or the current electrical voltage or the electrical voltage of the energy storage unit at the beginning of the N-holding phase is put into mathematical relation to the amount of electrical energy that is required to keep the transmission in a neutral position without frictional connection for a predefined period of time. It can correspondingly be provided in one example of an embodiment of such a function, that activation of the N-holding phase is prohibited when the mathematical difference between the current electrical charge state of the energy storage unit whose electrical energy is intended for starting the drive motor and/or for supplying the transmission control device, and the amount of electrical energy that is required in order to keep the transmission in a neutral position without frictional connection for a predetermined period of time falls below a predefined lower threshold value. An appropriate value for such a period of time is, for example, a period of 20 or 30 minutes. Such an amount of energy can be calculated relatively simply by integrating the fixed, theoretical current consumption of the components used over the predefined period of time or by integrating the mathematical product of the current operating voltage and theoretical current consumption of the transmission control device over the predefined period of time. In a further embodiment of this function, the cited predefined lower threshold value can also be predefined subject to a temperature of the drive motor or a temperature of the vehicle surroundings, where special consideration is given to battery discharge behavior and greater energy needs for starting a motor at low temperatures.

As a result, through logical linkage by way of "logical AND" of these entry criteria may be sub-functions, within the context of the third individual function of the method of the invention, a high degree of security is achieved against impermissible activation of the N-holding phase.

Returning to the last of the four individual functions of the method of the invention, the fourth individual function of the method of the invention ("WHEN the motor vehicle is at least approximately stationary AND at the same time the ignition circuit of the drive motor is electrically interrupted, AND at the same time a drive position "Neutral" (N) has been selected using the selector device, AND at the same time the N-holding phase is not activated, THEN the transmission will automatically be held the non-frictionally locked neutral position until such time as it is recognized that the driver intends to exit the vehicle or is in the process of exiting it, whereas when it has been recognized that the driver is exiting the vehicle or intends to do so, the parking lock of the transmission is automatically engaged") takes into account those operating states in which the selector device, before or during recognition that the motor vehicle is stationary with an interrupted ignition circuit, or is at least approximately stationary, is in the drive position "Neutral" (N), but the N-holding phase is not activated. In this case, the transmission, corresponding to the specification of the selector device, is initially automatically put into its neutral position. The motor vehicle is only kept in a stationary position by way of the parking lock being engaged when it is recognized that the driver intends to exit the motor vehicle or is in the process of doing so or until another exit condition is met. In this way, while observing essential security aspects, a certain mobility of the motor vehicle is allowed, even when the driver does not expressly wish it.

There can be an assumption regarding the driver's intention or actions: that he intends to exit the vehicle or is in the process of doing so, for example, when at least one or more of the following exemplary criteria is met:

"a driver's door of the motor vehicle is open"
"a driver's seat belt is unbuckled"
"a driver's seat occupancy recognition device reports an unoccupied driver's seat"

whereby it is reasonable to functionally combine at least two of these criteria by means of "logical AND."

Further additional exit conditions for automatically terminating the neutral position of the transmission selected using the selector device are, for example:

the selection of Neutral (N) using the selector device has been changed to "Park" (P),
and/or the energy management means of the motor vehicle is demanding automatic interruption in order to protect the electrical system of the motor vehicle, or as the case may be to maintain the starting capacity of the drive motor,
and/or the ignition key has been removed from its mechanical or electromechanical ignition switch or is outside a defined zone surrounding the electronic ignition switch.

Details will be provided below on the potential functions of the method of the invention in connection with the activated N-holding phase, subdivided into the categories "important functions in connection with activated N-holding phase" and "optional functions in connection with activated N-holding phase". If required, the person skilled in the art will be able to combine the proposed functions in a reasonable manner.

One important function is that at times when the N-holding phase is activated and/or has been activated, an acoustic and/or optical indicator is simultaneously activated. This reminds the driver that he must perform a manual intervention or may be that an intervention to arrest the movement of the motor vehicle has been undertaken and that the motor vehicle could therefore coast.

As an optional function to bolster security against unintentional removal of the ignition key, it can be provided that when the holding phase is activated and/or has been activated, an ignition switch lock—also known as a "key lock"—is activated/has been activated, which prevents the removal of the mechanical ignition key from its mechanical or electromechanical ignition switch or that the electronic ignition key—one of the "ID card" type, for example—is removed too far from its electronic ignition switch.

Regarding de-activation of a previous, deliberately activated N-holding phase, when the transmission is in a non-frictionally engaged neutral state, two variations are proposed. With the first of these two variations, it is proposed that the previously activated N-holding phase be manually de-activated by the driver—preferably by using the separate operating device, a function of the category "important functions". In this case, it is reasonable that when the previously activated N-holding phase is manually terminated, the parking lock is automatically engaged, independently of the drive position "Neutral" (N), which had been previously selected using the selector device. The driver also has the option of using the selector device to manually de-activate the previously activated N-holding phase by switching the selected drive position from the previous "Neutral" (N) to "Park" (P).

In the second variation, it is proposed that the previously activated N-holding phase, in which the transmission is in a non-frictionally connected neutral position, can be automatically de-activated. When that kind of automatic interruption of the previously activated N-holding phase should or must take place is determined particularly by considerations of operating safety and ensuring against system failure.

As an important function for protecting the electrical system of the motor vehicle and to ensure the starting capacity of the drive motor, it is proposed that it is possible for an energy management means of the motor vehicle or the transmission to automatically de-activate the previously activated N-holding phase. There has already been discussion, in the context of the entry criteria that have to be met in order to activate the N-holding phase, of the problems of conventional transmission constructions with electrohydraulically actuated parking lock systems, in which the parking lock is held in an engaged state by way of an electrically charged electromagnet. In connection with that kind of transmission in particular, the motor vehicle battery can be prevented, with the proposed functional extension, from having an excessively high discharge rate due to the amount of electrical energy consumed in connection with the method of the invention.

Monitoring of the current charge state or the current electrical voltage of the motor vehicle battery provides an efficient protection for the vehicle battery against too high a rate of discharge. Correspondingly, it is proposed in one design variation that the previously activated N-holding phase be automatically terminated when the current charge state and/or the current electrical voltage of an energy storage unit of the motor vehicle, whose electrical energy is intended for starting the drive motor and/or for supplying the transmission control device, has fallen to a value below a predefined discharge threshold. The term "predefined discharge threshold" should be understood here as an absolute numerical value, for example, an electric voltage of 12 volts.

In a technically more expensive, but functionally more precise embodiment of such a function for protecting the electric system of the motor vehicle and for securing the starting capacity of the drive motor, it is proposed that the amount of energy that is actually taken in the context of the function of the invention of the vehicle from the motor vehicle battery or from the electrical energy storage unit of the motor vehicle, in order to supply the transmission control device and/or to start the drive motor—particularly by the transmission control device—be monitored and placed in mathematical relation to the current charge state of the energy storage unit or the charge state of the energy storage unit at the beginning of the N-holding phase, or the current electrical voltage of the energy storage unit, or the electrical voltage of the energy storage unit at the beginning of the N-holding phase. Correspondingly, in one embodiment of such a function, it can be provided that the previously activated N-holding phase is automatically terminated when the mathematical difference between the current electrical charge state of the energy storage unit whose electrical energy is used for starting the drive motor and/or for supplying the transmission control device and the amount of electrical energy that is derived in the context of the function of the invention from the electric energy storage unit of the motor vehicle in order to maintain the neutral position of the transmission, exceeds a predefined upper threshold value, whereby this upper threshold value is predefined subject to the current electrical voltage of the energy storage unit at the beginning of the N-holding phase, or subject to the current electrical charge state of the energy storage unit, or subject to the electrical charge state of the energy storage unit at the beginning of the N-holding phase. An energy amount of this kind can, for example, be determined relatively simply in mathematical terms by integrating the actual, present current consumption of the transmission control device over the time since the beginning of the N-holding phase, or by integrating the mathematical product of the actual present operating voltage and the actual present current consumption of the transmission control device over the period of time since the beginning of the N-holding phase. In a further development of the function, the cited predefined upper threshold value can be predefined subject to a temperature of the drive motor or a temperature of the vehicle's surroundings, whereby the battery discharge behavior and the greater energy requirement for motor starting are given special consideration at lower temperatures.

As an optional function to bolster security against driver inattention, it can also be provided that the previously activated N-holding phase is automatically terminated when a predefined time stage has run out. This kind of automatic termination of the N-holding phase in the form of a reproducible event is easily comprehensible to the driver and is therefore less surprising than other automatic interruptions of the N-holding phase. This function has the additional advantage that the electric system of the motor vehicle is not put under excessive strain by the method of the invention, provided the charge state of the vehicle battery is not already at a low level at the beginning of the N-holding phase. The cited time stage reasonably starts when the command to activate the N-holding phase is recognized or no later than the point at which the transmission has actually assumed its neutral position.

As an optional function to assure greater security in situations of changing operating parameters, it is proposed that the previously activated N-holding phase be automatically terminated when the present speed of the motor vehicle is greater than a predefined speed threshold. This ensures that the motor vehicle can coast only within specified limits. This predefined speed threshold can also be higher than the predefined low threshold value for vehicle velocity that may not be exceeded when activating the N-holding phase.

In order to provide greater security in situations of changing operating parameters, it can be provided as an optional function that the previously activated N-holding phase is automatically terminated when the motor vehicle is not in an at least approximately horizontal position.

As an optional function to provide greater security against driver inattention and misuse, it is proposed that the previously activated N-holding phase be automatically ended when the ignition key is removed from its mechanical or electromechanical ignition switch or is located outside a defined zone around its electronic ignition switch.

In connection with all of the previously cited functions for automatic de-activation of the previously activated N-holding phase, for safety reasons, it is proposed that whenever the previously activated holding phase is automatically terminated, the parking lock be engaged, independently of the drive position "Neutral" that has been selected using the selector device. This will securely prevent the transmission later being put into the kind of shifting position that would lead to immediate frictional connection in the transmission.

An additional function in the category "important functions in activated N-holding phase" is the monitoring of whether the driver remains in the motor vehicle. In order to heighten security against inattention on the part of the driver, it is proposed that when it is recognized that the driver intends to exit the motor vehicle or is in the process of doing so, a suitable warning is issued or actuated without the N-holding phase being terminated. This warning, which might be acoustic and/or optical in nature, should inform the driver that the N-holding phase is still active and the transmission is therefore not frictionally connected and the motor vehicle could therefore coast. If the driver ignores this warning and exits the vehicle without switching to "Park" (P) using the selector device or/and without previously switching off the N-holding phase by way of the separate operating device, it can be assumed that he deliberately intends to leave the motor vehicle in a state in which it could coast, without having to be in the interior of the vehicle himself. The other criteria for automatic interruption of the N-holding phase are naturally not affected by this sub-function and can therefore, as described, still lead to automatic engagement of the parking lock. As mentioned above, an intention or an action on the part of the driver can be assumed—an intention to exit the vehicle or a circumstance in which the driver is actually exiting the vehicle—when one or more of the following exemplary criteria are met:

"a driver's door of the motor vehicle is open"

"a driver's seat belt is unbuckled"

"a driver's seat occupancy recognition device reports an unoccupied driver's seat".

In other respects, the person skilled in the art will, if required, combine the proposed embodiments for automatic de-activation of the N-holding phase in a reasonable manner and, if required, also combine them with the embodiments for manual de-activation of the N-holding phase.

BRIEF DESCRIPTION OF THE DRAWINGS

The invention will now be described, by way of example, with reference to the accompanying drawings in which.

DETAILED DESCRIPTION OF THE INVENTION

Figure 1A:
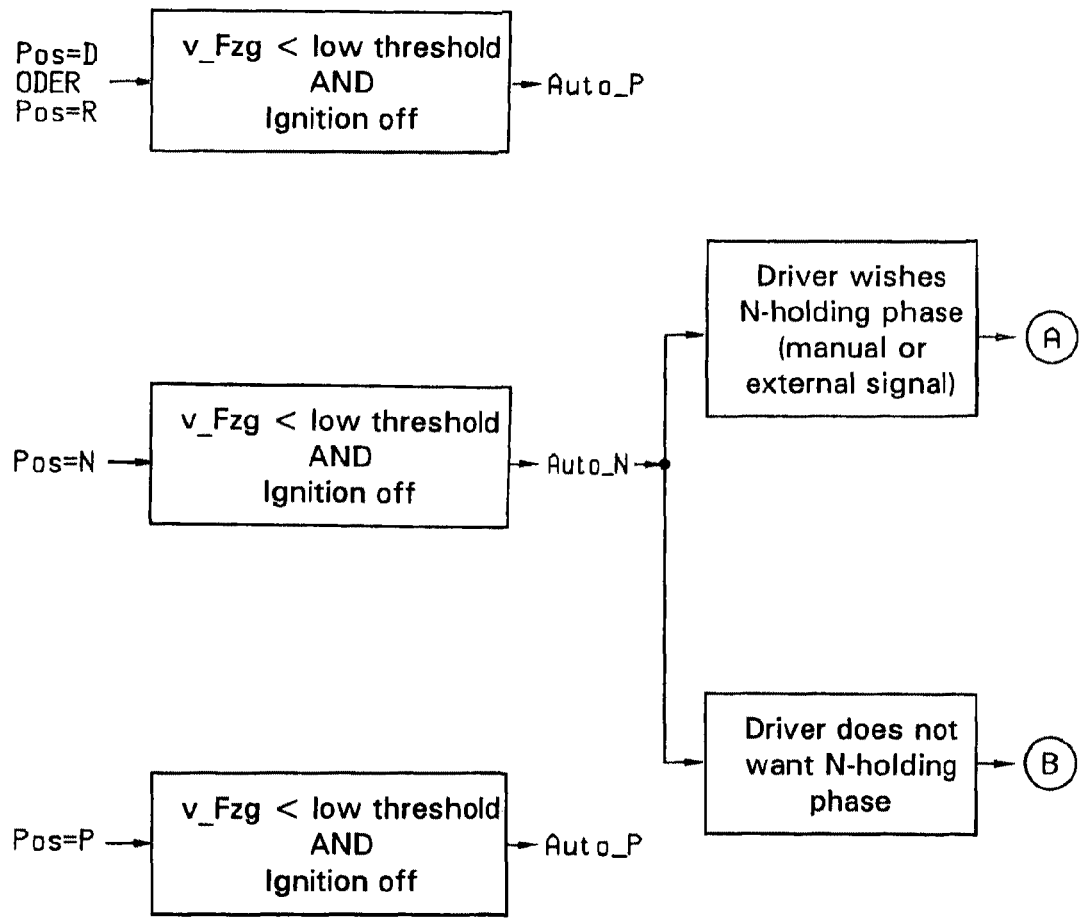
FIGS. 1A and 1B are operation sequence diagrams as an exemplary technical implementation of a method according to the inventive solution.
Figure 1B:
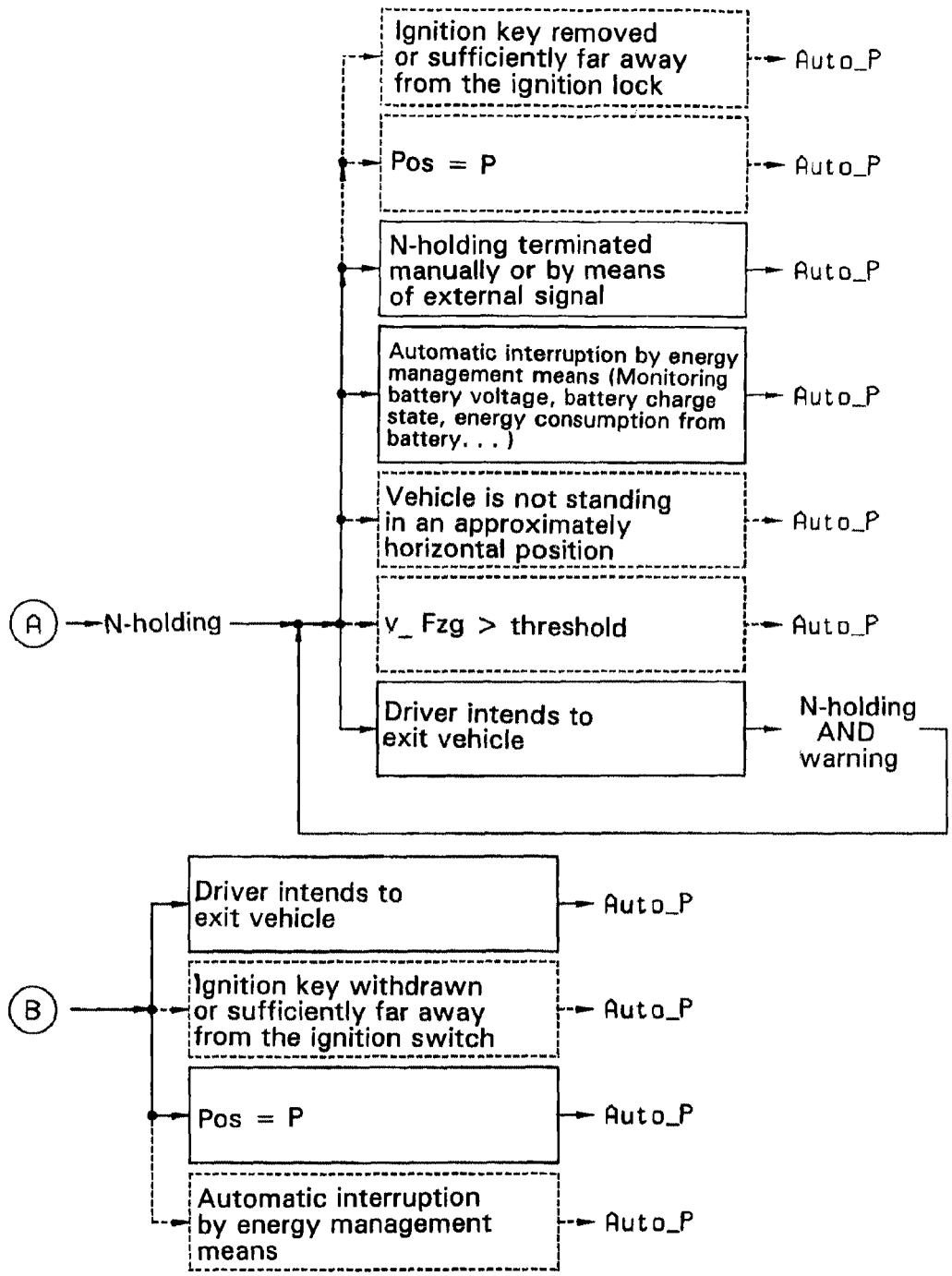

The function blocks that are absolutely essential in the context of this technical implementation are presented with a continuous line, whereas the function blocks that can be considered optional in the context of this technical implementation are presented with a dotted line. Because the graphic depiction as such is clearly understandable to the person skilled in the art, in view of the detailed description of the method of the invention, a comprehensive explanation of FIGS. 1A and 2A is not necessary but briefly, as noted above, FIGS. 1A and 1B are operation sequence diagrams as an exemplary technical implementation of a method according to the inventive solution. The reference signs used and their meanings are listed in the list of reference signs.

Further embodiments of the method of the invention that involve greater comfort for the driver of the motor vehicle are described below. It can be provided that additional units of the motor vehicle can be actuated using the separate operating device used to activate the N-holding phase. With this kind of further embodiment, it is particularly advantageous, if an additional command can be issued, using this separate operating device, at the same time or at approximately the same time as activation of the N-holding phase, to close an electromotively actuated sliding roof or an electromotively or electrohydraulically actuatable collapsible or folding roof and/or electromotively actuatable windows of the motor vehicle.

More detail will be supplied below concerning embodiments of the method of the invention that refer to special developments of the separate operating device, which is intended, at a minimum, for activation of the N-holding phase with the transmission in a non-frictionally connected neutral position.

It can be provided that the separate operating device for activating and de-activating the N-holding phase is designed as a switch that can be operated by the driver. Correspondingly, the N-holding phase, in which the transmission is in a non-frictionally connected neutral position, can be activated and/or de-activated by manual operation of this switch by the driver. The construction and spatial arrangement of this kind of switch in the interior of the motor vehicle are optional and at the discretion of the specialist. One example of an embodiment is an electromechanical switch that is integrated into the ignition switch in such a way that the N-holding phase is activated by the ignition circuit being interrupted by way of the ignition lock. As another example of an embodiment, an electromechanical switch can be mentioned that is designed as part of the selector device or is integrated into the selector device.

It can also be provided that the separate operating device for activating and de-activating the N-holding phase is designed as a remote-controllable switch that can be operated from outside the motor vehicle. Correspondingly, the N-holding phase, in which the transmission is in a non-frictionally engaged neutral position, can be activated and/or de-activated by operating this remote-controllable switch outside the motor vehicle. Systems with a (stationary or mobile) transmitter located outside the motor vehicle are relevant in this context in order to exercise a selective influence on the maneuverability of the motor vehicle from the outside by way of a transmitter at the entrance to a car-washing facility or a transmitter in a workshop.

Furthermore, it can also be provided that the separate operating device for activating and de-activating the N-holding phase is configured as a sensor that evaluates signals in the vicinity of the motor vehicle. Correspondingly, the N-holding phase, in which the transmission is in a non-frictionally connected neutral position, can then be activated and/or de-activated by this sensor. This concerns, in particular, sensors for image acquisition that can detect, in a suitable manner, signs indicating the entrance to a motor vehicle washing facility or a railroad crossing, in the sense of pattern recognition of predefined environmental conditions, in cases where the drive position selected using the selector device does not necessarily have the highest priority with regard to the drive position that is actually engaged in the transmission.

If required, the specialist will be able to combine the three cited switch variations appropriately: "switch that can be operated by the driver", "remote-controllable switch" and "sensor".

In principle, the method of the invention is suitable for controlling a parking device of any type that is intended to keep a motor vehicle stationary. The parking device can therefore be configured both as a positive-locking, arresting parking lock and a non-positive locking, arresting parking brake. Usually, a transmission-side parking device is configured as a parking lock, but it can also be configured as a parking brake.

Usually, the parking lock of a transmission with automatic or automated shifting is integrated into the transmission itself. In known transmissions, the control system for the parking lock, which operates mechanically, hydraulically, pneumatically, electrically, hydraulic-mechanically, pneumatic-mechanically, electromechanically, electrohydraulically, or electropneumatically, is usually integrated into the transmission or arranged immediately outside the transmission. With an electromechanically, electrohydraulically or electropneumatically operating control system for the parking lock, the actuator acting on the parking lock is usually controlled by a transmission control device. It is therefore reasonable to integrate all of the control functions that are necessary to convert the command to activate and subsequently de-activate the inventive N-holding phase with a non-frictionally connected neutral position of the transmission in the transmission into the transmission control device so that the transmission control device initiates the engagement of the neutral position in the transmission when the N-holding phase is activated, as well as the engagement of the transmission-side parking device when the inventive N-holding phase is de-activated.

In principle, however, a separate control device can also be provided for this, which then communicates in a suitable manner with the transmission and its transmission control device. In each case, appropriate communication is required between the separate operating device and the transmission or the transmission control device. It can be provided that the engagement of the neutral position in the transmission when activating the N-holding phase, as well as the engagement of the parking lock when de-activating the N-holding phase are initiated by a control device of the separate operating device of the motor vehicle.

As mentioned above, the method of the invention is also, in principle, appropriate for controlling a parking brake of any type. A parking brake provided in the vehicle is usually an integral part of the vehicle's driving brake system and can be operated mechanically or electrohydraulically by the driver and, if available, also by a brake control device. However, independent systems, i.e., systems that are independent of the driving brake, are also known. Concerning the control of a parking brake in the vehicle in the inventive context, there must in any case be appropriate communication between the separate operating device and the other two components involved "parking brake and transmission or braking system and transmission control device."

The motor vehicle of the invention features an automatic or automated transmission, a selector device that can be operated by the driver to select a drive position (P, R, N, D) of the transmission, a parking lock to immobilize of the motor vehicle, a control device for actuating the parking lock of the transmission and subject to shifting positions in the transmission subject to the drive position (P, R, N, D) selected using the selector device and subject to other operating parameters of the motor vehicle, as well as an additional, separate operating device for setting a holding phase in which the transmission is in a non-frictionally connected neutral position, and is controlled by the previously described method of the invention.

| Reference numerals | |
|---|---|
| V_Fzg | vehicle speed |
| Pos | a drive position selected using the selector device |
| P | the drive position "Park" |
| N | the drive position "Neutral" |
| R | the drive position "Reverse" |
| D | the drive position "Forward" |
| Auto_N | function step "Engaging and leaving the neutral position in the transmission" |
| Auto_P | function step "Engaging the parking lock and leaving the parking lock in the engaged state" |
| N_Holding | function step "Leaving the transmission in the neutral position" |
| N_Holding phase | the state, "Transmission in non-frictionally engaged neutral position" |

The invention claimed is:

1. A method of controlling a neutral position and a parking lock of one of an automatic or an automated transmission of a motor vehicle, the neutral position and the parking lock being engaged, for immobilizing the motor vehicle, depending on a drive position (P, R, N, D) selected with a selector device by a driver of the motor vehicle and depending on other motor vehicle operating parameters, the method comprising the following steps of:

automatically engaging and retaining engagement of the parking lock of the transmission WHEN simultaneously the motor vehicle is at least approximately stationary, AND an ignition circuit acting on a drive motor of the motor vehicle is electrically interrupted, AND a drive position "Park" (P) has been selected using the selector device;

automatically engaging the parking lock of the transmission WHEN simultaneously the motor vehicle is at least approximately stationary, AND the ignition circuit of the drive motor is electrically interrupted, AND a drive position "Forward" (D) or "Reverse" (R) has been selected using the selector device;

automatically shifting and temporarily retaining the transmission in a non-frictionally engaged neutral position WHEN simultaneously the motor vehicle is at least approximately stationary, AND the ignition circuit of the drive motor is electrically interrupted, AND a drive position "Neutral" (N) has been selected using the selector device, AND a Neutral-holding phase has been activated using a separate operating device if the parking lock of the transmission is disengaged; and automatically retaining the transmission in a non-frictionally connected neutral position until it is detected that the driver wants to leave or is leaving the vehicle, upon which the parking lock is automatically engaged for immobilizing the motor vehicle, WHEN simultaneously the motor vehicle is at least approximately stationary, AND the ignition circuit of the drive motor is electrically interrupted, AND the drive position "Neutral" (N) has been selected using the selector device, AND the Neutral-holding phase is not activated.

2. The method according to claim 1, further comprising the step of predefining a time stage, within which the Neutral-holding phase is activated using the separate operating device, such that the parking lock of the transmission is not automatically engaged.

3. The method according to claim 1, further comprising the step of activating the Neutral-holding phase only when the motor vehicle is in a horizontal position.

4. The method according to claim 1, further comprising the step of activating the N-holding phase only when one of an ignition key remains in a mechanical or an electromechanical ignition switch, assigned to the ignition key, and the ignition key remains within a defined zone surrounding an electronic ignition switch of the motor vehicle, assigned to the ignition key.

5. The method according to claim 1, further comprising the step of activating the Neutral-holding phase only when it is recognized that the driver of the motor vehicle does not intend to exit the vehicle or is not exiting the vehicle.

6. The method according to claim 1, further comprising the step of permitting activation of the Neutral-holding phase only when an energy management system of the motor vehicle or the transmission indicates that a sufficient amount of energy is available to hold the transmission, at least for a predefined period of time, in a non-frictionally engaged neutral position.

7. The method according to claim 6, further comprising the step of the energy management system only permitting activation of the Neutral-holding phase when at least one of a current charge state and a current electrical voltage of an energy storage unit of the motor vehicle, which supplies electrical energy to at least one of a control device of the transmission and a starter of the drive motor is greater than a predefined threshold value.

8. The method according to claim 6, further comprising the step of the energy management system only permitting activation of the Neutral-holding phase when a mathematical difference between the current electrical charge state of the energy storage unit, which supplies the electrical energy for starting the drive motor and supplying the control device of the transmission, and an amount of electrical energy, which is required to retain the transmission for the predefined period of time in a non-frictionally engaged neutral position, is greater than a predefined upper threshold value.

9. The method according to claim 8, further comprising the step of determining the amount of energy by one of mathematically integrating a consumption of electric current by the control device over the predefined period of time or mathematically integrating a product of an actual operating voltage and a current consumption of the control device over the predefined period of time.

10. The method according to claim 7, further comprising the step of predefining the upper threshold value subject to a temperature of one of the drive motor or an area surrounding the vehicle.

11. The method according to claim 1, further comprising the step of enabling the driver to de-activate manually the previously activated Neutral-holding phase with the separate operating device.

12. The method according to claim 1, further comprising the step of automatically de-activating the previously activated Neutral-holding phase.

13. The method according to claim 12, further comprising the step of automatically terminating the previously activated Neutral-holding phase when at least one of the following conditions are recognized:

an ignition key has been removed from one of a mechanical and an electromechanical ignition lock, or the ignition key is withdrawn from a defined zone around an electronic ignition switch;

a current actual speed of the motor vehicle is greater than a predefined speed threshold;

the motor vehicle is not in a horizontal position;

the driver intends to exit the vehicle or is in the process of exiting the vehicle; and a predefined period of time has expired.

14. The method according to claim 12, further comprising the step of automatically de-activating the previously activated Neutral-holding phase by an energy management means of the motor vehicle.

15. The method according to claim 14, further comprising the step of the automatically de-activating the previously activated Neutral-holding phase when a value of at least one of a current charge state and an actual electrical voltage of an energy storage unit of the motor vehicle, electrical energy of which is intended for at least one of supplying a control device of the transmission and starting the drive motor, is below a predefined discharge threshold.

16. The method according to claim 14, further comprising the step of automatically de-activating the previously activated Neutral-holding phase when an amount of energy, which is withdrawn from the electrical energy storage unit of the motor vehicle that at least one of supplies a control device of the transmission and starts the drive motor, is equal to or greater than a predefined threshold value.

17. The method according to claim 16, further comprising the step of determining the amount of energy is determined by mathematically integrating one of an actual electric power consumption of the control device over time or the product of an actual operating voltage and the actual power consumption of the control device over the time.

18. The method according to claim 12, further comprising the step of automatically engaging the parking lock when the previously activated Neutral-holding phase is one of manually or automatically terminated.

19. The method according to claim 1, further comprising the step of actuating other units with the separate operating device, which activates the Neutral-holding phase.

20. The method according to claim 19, further comprising the step of implementing a command at least approximately simultaneously with the activation of the Neutral-holding phase, to close at least one of an electromotorically operated sliding roof, an electromotorically or an electrohydraulically operated roof and an electromotorically operated window of the motor vehicle.

21. The method according to claim 1, further comprising the step of enabling the driver to at least one of activating and de-activating manually the Neutral-holding phase with a switch.

22. The method according to claim 1, further comprising the step of at least one of activating and de-activating remotely the Neutral-holding phase with a remote-controlled switch from outside the motor vehicle.

23. The method according to claim 1, further comprising the step of evaluating signals in a vicinity of the motor vehicle with a sensor for at least one of activating and de-activating the Neutral-holding phase.

24. The method according to claim 1, further comprising the step of actuating at least one of an acoustic and an optical signal when it is detected that the driver one of wants to leave the vehicle or is leaving the vehicle, while the Neutral-holding phase is activated.

25. A motor vehicle having one of an automatic or automated transmission comprises:
   a selector device, which is operated by a driver of the motor vehicle to select a drive position (P, R, N, D) of the transmission,
   a transmission-side parking lock,
   a control device for actuating the parking lock of the transmission depending on the drive position (P, R, N, D) of the transmission selected using the selector device and other operating parameters of the motor vehicle, and
   an additional separate operating device for activating an Neutral-holding phase, in which the transmission is in a non-frictionally connected neutral position according to a method comprising one of:
   automatically engaging and retaining engagement of the parking lock of the transmission WHEN simultaneously the motor vehicle is at least approximately stationary, AND an ignition circuit acting on a drive motor of the motor vehicle is electrically interrupted, AND a drive position "Park" (P) has been selected using the selector device;
   automatically engaging the parking lock of the transmission WHEN simultaneously the motor vehicle is at least approximately stationary, AND the ignition circuit of the drive motor is electrically interrupted, AND a drive position "Forward" (D) or "Reverse" (R) has been selected using the selector device;
   automatically shifting and temporarily retaining the transmission in a non-frictionally engaged neutral position WHEN simultaneously the motor vehicle is at least approximately stationary, AND the ignition circuit of the drive motor is electrically interrupted, AND the drive position "Neutral" (N) has been selected using the selector device, AND a Neutral-holding phase has been activated using a separate operating device if the parking lock of the transmission is disengaged; and
   automatically retaining the transmission in a non-frictionally connected neutral position until it is detected that the driver wants to leave or is leaving the vehicle, upon which the parking lock is automatically engaged to immobilize the motor vehicle, WHEN simultaneously the motor vehicle is at least approximately stationary, AND the ignition circuit of the drive motor is electrically interrupted, AND the drive position "Neutral" (N) has been selected using the selector device, AND the Neutral-holding phase is not activated.

* * * * *